(12) United States Patent
Kojima et al.

(10) Patent No.: US 8,956,449 B2
(45) Date of Patent: *Feb. 17, 2015

(54) NON-CURABLE COATING COMPOSITION

(75) Inventors: Kazuhiko Kojima, Ichihara (JP); Masaru Ozaki, Ichihara (JP); Tsunehito Sugiura, Ichihara (JP); Seiji Hori, Chiba (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/641,760

(22) PCT Filed: Apr. 1, 2011

(86) PCT No.: PCT/JP2011/058857
§ 371 (c)(1),
(2), (4) Date: Dec. 11, 2012

(87) PCT Pub. No.: WO2011/132547
PCT Pub. Date: Oct. 27, 2011

(65) Prior Publication Data
US 2013/0074725 A1    Mar. 28, 2013

(30) Foreign Application Priority Data

Apr. 20, 2010 (JP) ................................. 2010-097051

(51) Int. Cl.
| | |
|---|---|
| *C08K 5/5419* | (2006.01) |
| *C09D 5/00* | (2006.01) |
| *C09D 183/06* | (2006.01) |
| *C09D 183/12* | (2006.01) |
| *D21F 1/30* | (2006.01) |
| *D21F 1/32* | (2006.01) |
| *D21F 5/02* | (2006.01) |
| *C08G 77/14* | (2006.01) |
| *C08G 77/46* | (2006.01) |

(52) U.S. Cl.
CPC ................ *C09D 5/00* (2013.01); *C09D 183/06* (2013.01); *C09D 183/12* (2013.01); *D21F 1/30* (2013.01); *D21F 1/32* (2013.01); *D21F 5/02* (2013.01); *C08G 77/14* (2013.01); *C08G 77/46* (2013.01)
USPC ................................ 106/2; 524/262; 524/266

(58) Field of Classification Search
USPC ....................... 106/2; 524/262, 266
See application file for complete search history.

(56) References Cited

U.S. PATENT DOCUMENTS

| | | | | |
|---|---|---|---|---|
| 4,366,001 | A | * | 12/1982 | Ona et al. ................ 106/287.11 |
| 4,427,815 | A | * | 1/1984 | Ona et al. .................... 252/8.61 |
| 6,248,855 | B1 | * | 6/2001 | Dalle et al. ...................... 528/26 |
| 7,323,086 | B1 | | 1/2008 | Sekiya |
| 7,585,393 | B2 | | 9/2009 | Sekiya et al. |
| 8,500,900 | B2 | * | 8/2013 | Sugiura et al. .......... 106/287.13 |
| 2006/0130990 | A1 | * | 6/2006 | Arfaoui et al. ................ 162/158 |
| 2006/0162888 | A1 | | 7/2006 | Sekiya et al. |

FOREIGN PATENT DOCUMENTS

| | | |
|---|---|---|
| CN | 1114334 A | 1/1996 |
| CN | 1304688 A | 3/2007 |
| EP | 1 473 405 A1 | 11/2004 |
| JP | 04-130190 A | 5/1992 |
| JP | 07-292382 A | 11/1995 |
| JP | H 10-053962 A | 2/1998 |
| JP | 2000-096476 A | 4/2000 |
| JP | 2001-020191 A | 1/2001 |
| JP | 2003-213587 A | 7/2003 |
| JP | 2004-010751 A | 1/2004 |
| JP | 2004-250840 A | 9/2004 |
| JP | 2005-281583 A | 10/2005 |
| WO | WO 2010/047409 A1 | 4/2010 |

OTHER PUBLICATIONS

English language abstract for JP 04-130190 extracted from the PAJ database on Jan. 8, 2013, 6 pages.
English language abstract and machine-assisted English translation for JP 07-292382 extracted from the PAJ database on Jan. 8, 2013, 30 pages.
English language abstract for JP 2000-096476 extracted from the espacenet.com database on Jan. 8, 2013, 14 pages.
English language abstract for JP 2003-213587 extracted from the espacenet.com database on Jan. 8, 2013, 16 pages.
English language abstract and machine-assisted English translation for JP 2004-250840 extracted from the PAJ database on Jan. 8, 2013, 47 pages.

(Continued)

*Primary Examiner* — Margaret Moore
(74) *Attorney, Agent, or Firm* — Howard & Howard Attorneys PLLC (57) ABSTRACT

[Problem to be Solved]
To provide a non-curable coating composition which is used for preventing or reducing the adhesion of various sticky substances to the surfaces of substrates and is stable at elevated temperature, by using modified silicones having functional groups.

[Means to Solve the Problem]
A non-curable coating composition characterized by containing a carboxy-modified silicone with a carboxy group at a side chain thereof, and an epoxy/oxyalkylene-modified silicone with an epoxy group and an oxyalkylene group at a side chain thereof in a weight ratio ranging from 1:2 to 1:30, and further comprising an oxyalkylene-modified silicone having an HLB of 10 or more with an oxyalkylene group at a side chain thereof.

16 Claims, 1 Drawing Sheet

(56) References Cited

OTHER PUBLICATIONS

International Search Report for Application No. PCT/JP2011/058857 dated Jun. 17, 2011, 3 pages.

English language abstract and machine-assisted English translation for JP 2001-020191 extracted from the PAJ database on Aug. 13, 2014, 25 pages.

English language abstract and machine-assisted English translation for JP 2004-010751 extracted from the PAJ database on Aug. 13, 2014, 44 pages.

English language abstract and machine-assisted English translation for CN 1114334 extracted from espacenet.com database on Sep. 11, 2014, 48 pages.

English language abstract not found for CN 1304688; however, see English language equivalent U.S. 7,585,393 (previously submitted on Jan. 16, 2013). Original document extracted from espacenet.com database on Sep. 11, 2014, 31 pages.

English language abstract and machine-assisted English translation for JPH 10-053962 extracted from the PAJ database on Sep. 11, 2014, 24 pages.

English language abstract and machine-assisted English translation for JP 2005-281583 extracted from the PAJ database on Sep. 11, 2014, 23 pages.

\* cited by examiner

NON-CURABLE COATING COMPOSITION

RELATED APPLICATIONS

This application is the National Stage of International Patent Application No. PCT/JP2011/058857, filed on Apr. 1, 2011, which claims priority to and all the advantages of Japanese Patent Application No. 2010-097051, filed on Apr. 20, 2010, the content of which is incorporated herein by reference.

TECHNICAL FIELD

The present invention relates to a non-curable coating composition which is used for preventing adhesion of various sticky substances to the surfaces of substrates.

BACKGROUND ART

At the time of forming and processing of sticky substances such as food products, adhesives, asphalt, tar, plastics, rubbers, and the like, various coating agents are used in order to prevent adhesion of the aforementioned sticky substances or contaminants to various substrates.

For example, various coating agents have been used for packaging materials for frozen meals; surface treatments for food preparation tools such as frying pans, toasters and the like; mold release agents for use in molds for forming plastics, rubbers and the like; interior treatments of paperboard containers for use in cooling and solidifying asphalt, tar and the like; and releasing agents for preventing adhesion between substrates coated by adhesives such as adhesive tapes, compression tapes, patches and the like. In addition, when recycled paper is produced by recycling waste paper, coating agents have also been used in order to prevent adhesion of various sticky components such as pitch, tar, ink and the like contained in waste paper, to press rolls, dryer rolls, canvases and the like of paper machines.

One of the aforementioned coating agents is a curable coating agent in which the coating agent is applied to a substrate, followed by curing to form a non-adhesive layer, and another is a non-curable coating agent in which the coating agent in the form of a liquid is applied to a substrate, as it is, to form a nonadhesive layer, followed by using, as it is, without curing. The aforementioned surface treatments, interior treatments and releasing agents are curable coating agents. On the other hand, the coating agents used in the step for producing recycled paper belong to non-curable coating agents. As the aforementioned mold release agents, both curable types and non-curable types are known.

As examples of non-curable coating agents, the following patent applications are published and known.

Japanese Unexamined Patent Application, First Publication No. H04-130190 discloses a lubricant for cleaning the surface of a paper dryer comprising an oil-based substance and a surfactant, in which examples of the oil-based substances include polybutene, machine oil, liquid paraffin and the like. However, in order to form a non-adhesive layer composed of the aforementioned oil-based substances, it is necessary to use a large amount of oil-based substances. For this reason, there are economical problems. Therefore, in Japanese Unexamined Patent Application, First Publication No. H07-292382, a silicone oil comprising a polydimethylsiloxane is used in order to obtain a sufficient non-adhesive layer while reducing the amount of the oil-based substances, as much as possible.

In the silicone oil of a polydimethylsiloxane, oxygen atoms of the siloxane main-chain thereof are oriented to the surface of a substrate, and the methyl groups binding to silicon atoms are oriented to the outside. For these reasons, when the silicone oil is applied to a substrate such as a press roll, a dryer roll, a canvas or the like of a paper machine, a non-adhesive layer formed from the aforementioned silicone oil can coat the surface of the substrate more strongly, but in fact, the silicone oil transfers to paper during the step of producing paper before reaching the aforementioned state. Thereby, sticky components in the waste paper may adhere to the surface of the aforementioned substrate.

Therefore, an approach has been proposed in which a silicone oil having a functional group is used instead of the silicone oils of polydimethylsiloxanes. For example, Japanese Unexamined Patent Application, First Publication No. 2000-96476 proposes that various silicone oils are applied to canvases in paper machines, in which examples of the aforementioned silicone oils include, in addition to a methylphenylsilicone oil and a diethylsilicone oil, an amino-modified silicone oil, an epoxy-modified silicone oil, and a higher fatty acid-modified silicone oil. In addition, Japanese Unexamined Patent Application, First Publication No. 2003-2135837 (Japanese Patent No. 3388450) proposes a method for preventing contamination on the surface of a dryer roll or canvas by means of forming a non-adhesive layer which is produced by spraying an oil-in-water (O/W) emulsion of an epoxy-modified silicone oil or an amino-modified silicone oil on the surface of a dryer roll or canvas during the step of producing paper.

PRIOR ART DOCUMENTS

[Patent Document 1] JP-A-H04-130190
[Patent Document 2] JP-A-H07-292382
[Patent Document 3] JP-A-2000-96476
[Patent Document 4] JP-A-2003-213587

DISCLOSURE OF INVENTION

Technical Problems

In the case of using a modified silicone oil having a functional group with rich reactivity such as an epoxy group, an amino group, a carboxy group or the like as a coating agent for a substrate such as a press roll, dryer roll, canvas or the like of a paper machine, the aforementioned modified silicone oil is more useful, compared with a silicone oil of a polydimethylsiloxane since the modified silicone oil exhibits enhanced adhesiveness with respect to the surface of the aforementioned substrate. However, even if the modified silicones having the aforementioned functional groups are used, adhesion of sticky components such as pitch and the like to the surface of the aforementioned substrates cannot be instantly and sufficiently prevented.

In addition, at the time of applying to a substrate such as a press roll, dryer roll, canvas or the like of a paper machine, the usage circumstance of the coating agent may be at an increased temperature such as 80° C. or higher. In the aforementioned case, the conventional coating agents lack stability. For example, in the coating agents in the form of an emulsion composed of an oil phase and an aqueous phase, the emulsion separates under the circumstances at increased temperatures, it may be difficult to uniformly apply the coating agent to the substrate, or a spray for use in application may be clogged.

The present invention has an objective of providing a non-curable coating composition in which a modified silicone having a functional group is used, and adhesion of sticky substances to the surface of a substrate can be effectively prevented or reduced, and superior stability at increased temperatures can be exhibited as well.

Technical Solution

The objective of the present invention can be achieved by a non-curable coating composition comprising:
 a carboxy-modified silicone represented by the following general formula (1):

$$R_3SiO(R_2SiO)_m(PASiO)_nSiR_3 \quad (1)$$

wherein
each R independently represents a $C_{1-6}$ alkyl group;
A represents a carboxy-containing group;
m represents a number ranging from 0 to 1,000; and
n represents a number ranging from 2 to 100,
and
 an epoxy/oxyalkylene-modified silicone represented by the following general formula (2):

$$R_{3-p}X_pSiO(R_2SiO)_x(RXSiO)_y(RYSiO)_zSiX_qR_{3-q} \quad (2)$$

wherein
each R independently represents a $C_{1-6}$ alkyl group;
X represents an epoxy-containing group;
Y represents an oxyethylene-containing group;
p represents a number ranging from 0 to 1;
q represents a number ranging from 0 to 1;
x represents a number ranging from 0 to 500;
y represents a number ranging from 1 to 100; and
z represents a number ranging from 1 to 300,
wherein the weight ratio of the carboxy-modified silicone and the epoxy/oxyalkylene-modified silicone oil ranges from 1:2 to 1:30,
and further comprising
 an oxyalkylene-modified silicone having an HLB of 10 or more, represented by the following general formula (3):

$$R_{3-p}Y_pSiO(R_2SiO)_a(RYSiO)_bSiY_qR_{3-q} \quad (3)$$

wherein
each R independently represents a $C_{1-6}$ alkyl group;
Y represents an oxyethylene-containing group;
p represents a number ranging from 0 to 1;
q represents a number ranging from 0 to 1;
a represents a number ranging from 0 to 100;
b represents a number ranging from 0 to 50; and
p+t+q+b is a number of 1 or more.
Each of the modified silicones (1) to (3) may be a single type one or a mixture of plural types specified in each of the aforementioned general formulae. In the case of the mixture of plural types thereof, the aforementioned general formulae (1) to (3) represent average formulae.

The aforementioned carboxy-containing group is preferably represented by a formula: —$(CH_2)_l$—COOZ wherein Z represents H, an alkali metal or ammonium and l represents a number ranging from 0 to 12.

The aforementioned epoxy-containing group is preferably a glycidoxyalkyl group, an epoxycycloalkylalkyl group, or an oxyranylalkyl group.

The aforementioned oxyethylene-containing group in the aforementioned epoxy/oxyalkylene-modified silicone or the aforementioned oxyalkylene-modified silicone is preferably represented by the formula: —$(CH_2)_r$—$(OC_2H_4)_n$—$(OC_3H_6)_t$—B wherein B represents H, OH, OR, COOH or COOR in which R has the same meaning as defined above; r represents a number ranging from 0 to 4; s represents a number ranging from 1 to 200; t represents a number of 0 or more, but less than 200; and $0 \leq t < s$.

The aforementioned weight ratio preferably ranges from 1:3 to 1:20.

The aforementioned oxyalkylene-modified silicone has an HLB preferably ranging from 10 to 18.

The aforementioned oxyalkylene-modified silicone is preferably blended in an amount ranging from 0.1 to 10 parts by weight with respect to 100 parts by weight of the non-curable coating composition excluding the aforementioned oxyalkylene-modified silicone.

The non-curable coating composition according to the present invention is preferably in the form of an emulsion such as an oil-in-water emulsion or a water-in-oil emulsion.

The non-curable coating composition of the present invention can be used as a coating agent for forming a non-adhesive layer, or a contamination preventer for use in a paper machine.

Advantageous Effects

The non-curable coating composition of the present invention can form a non-adhesive layer on the surface of a substrate, and thereby, adhesion of sticky substances to the aforementioned surface can be effectively prevented or reduced. It is believed that the effects of the present invention may be provided, in particular, by means of balance between effects of forming a non-adhesive layer due to enhanced adhesiveness to the surface of the substrate which a carboxy-modified silicone possesses and effects of preventing adhesion of sticky substances which an epoxy/oxyalkylene-modified silicone possesses.

In addition, the non-curable coating composition of the present invention possesses superior stability at increased temperatures. Therefore, the non-curable coating composition of the present invention can be used well even under operation circumstances at increased temperatures such as a case of applying to a substrate such as a press roll, dryer roll, canvas or the like of a paper machine, and can be uniformly applied to the substrate. In addition, even if a spray is used during application, the spray nozzle thereof is never clogged.

The non-curable coating composition of the present invention can be used as a non-curable coating agent with respect to various substrates. In particular, the non-curable coating composition can be applied to the surface of a press roll, dryer roll, canvas or the like of a paper machine, and thereby, adhesion of sticky contamination substances such as pitch, tar, ink and the like to the aforementioned surface can be effectively prevented.

BEST MODES FOR CARRYING OUT THE INVENTION

The non-curable coating composition of the present invention does not have properties of being cured due to heat or water, and in addition, does not need to be cured. The non-curable coating composition of the present invention is used for coating, as it is, and thereby, effects of the present invention can be exhibited. In addition, the non-curable coating composition of the present invention contains a carboxy-modified silicone having carboxy groups at the side chains and an epoxy/oxyalkylene-modified silicone having epoxy groups and oxyalkylene groups at the side chains in a specified ratio thereof.

The carboxy-modified silicone is represented by the following general formula (1):

$$R_3SiO(R_2SiO)_m(RASiO)_nSiR_3 \quad (1)$$

wherein
each R independently represents a $C_{1-6}$ alkyl group;
A represents a carboxy-containing group;
m represents a number ranging from 0 to 1,000, and preferably represents a number selected in order to have m+n ranging from 2 to 1,000, more preferably ranging from 300 to 1,000, and in particular, preferably ranging from 380 to 500; and
n represents a number ranging from 2 to 100, and preferably represents a number ranging from 2 to 20.

The $C_{1-6}$ alkyl groups are exemplified as straight-chain or branched-chain alkyl groups, such as a methyl group, an ethyl group, a n-propyl group, an isopropyl group, a n-butyl group, an isobutyl group, a sec-butyl group, a tert-butyl group, a pentyl group, a hexyl group, and the like. In particular, a methyl group is preferable.

The aforementioned carboxy-containing group is preferably a group represented by the formula: —$(CH_2)_l$—COOZ wherein Z represents H, an alkali metal or ammonium; and l represents a number ranging from 0 to 12 and preferably represents a number of 0 or 3 to 11. Examples of the aforementioned alkali metals may include sodium, potassium and the like. In view of the stability of a composition and the like, X is preferably an alkali metal or ammonium.

As carboxy-modified silicones, in addition to the type having carboxy groups in at least the side chains of the polysiloxane main-chain (side chain type), there is a type having carboxy groups only at both molecular terminals (both terminal type). In the present invention, the side chain type is used. The both terminal type can have only two carboxy groups per molecule, and for this reason, it is difficult to ensure adhesiveness to the surface of the substrate. Therefore, the usage amount may be increased, as compared to the usage amount in the case of the side chain type, and it is difficult to control adhesiveness to the surface of the substrate. In contrast, the side chain type has a relatively large amount of carboxy groups, and for this reason, it is relatively easy to control adhesiveness by controlling the usage amount thereof.

As the aforementioned carboxy-modified silicone, for example, $(CH_3)_3SiO[(CH_3)_2SiO]_m[CH_3(HOOC(CH_2)_{2-10})SiO]_nSi(CH_3)_3$ wherein m and n have the same meanings as defined above, with the proviso that m+n is within a range of 380 to 500, can be used.

The aforementioned epoxy/oxyalkylene-modified silicone is represented by the following general formula (2):

$$R_{3-p}X_pSiO(R_2SiO)_x(RXSiO)_y(RYSiO)_zSiX_qR_{3-q} \quad (2)$$

wherein
each R independently represents a $C_{1-6}$ alkyl group;
X represents an epoxy-containing group;
Y represents an oxyethylene-containing group;
p represents a number ranging from 0 to 1;
q represents a number ranging from 0 to 1;
x represents a number ranging from 0 to 500, preferably ranging from 0 to 120, and more preferably ranging from 3 to 50;
y represents a number ranging from 1 to 100, preferably ranging from 1 to 10, and more preferably ranging from 1 to 5; and z represents a number ranging from 1 to 300, preferably ranging from 1 to 10, and more preferably ranging from 1 to 5.

The aforementioned $C_{1-6}$ alkyl group is as described above.

The aforementioned epoxy-containing group is necessarily present at the side chain of the polysiloxane main chain, but may not be necessarily present at the molecular terminal. The aforementioned epoxy-containing group is never present only at the terminal of the polysiloxane main chain. The epoxy-containing group is not particularly limited. A glycidoxyalkyl group such as a 2-glycidoxyethyl group, a 3-glycidoxypropyl group, a 4-glycidoxybutyl group or the like; an epoxycycloalkylalkyl group such as a 2-(3,4-epoxycyclohexyl)ethyl group, a 3-(3,4-epoxycyclohexyl) propyl group or the like; and an oxyranylalkyl group such as an oxyramylmethyl group, a 2-oxyranylethyl group, a 4-oxyranylbutyl group, a 3-oxyranyloctyl group or the like are preferable. A glycidoxyalkyl group and an epoxycycloalkylalkyl group are more preferable, and a 3-glycidoxypropyl group and a 2-(3,4-epoxycyclohexyl)ethyl group are, in particular, preferable.

The aforementioned oxyethylene-containing group is preferably represented by the formula: —$(CH_2)_r$—$(OC_2H_4)_s$—$(OC_3H_6)_t$—B wherein B represents H, OH, OR, COOH or COOR in which R is the same as described above; r represents a number ranging from 0 to 4, and preferably represents a number ranging from 2 to 4; s represents a number ranging from 1 to 200, preferably represents a number ranging from 5 to 100, and more preferably represents a number ranging from 10 to 50; and t represents a number which is 0 or more, but less than 200, is preferably 0 or more, but less than 100, and is more preferably 0 or more, but less than 10, and 0≤t<s. As is apparent from the definition of the aforementioned formula, the oxyethylene-containing group may contain an oxypropylene group, but in the case in which an oxypropylene group is present, the ratio of an oxyethylene group/an oxypropylene group preferably exceeds 1, and it is preferable that an oxypropylene group not be present. Therefore, in the aforementioned formula, t=0 is, in particular, preferable.

As the aforementioned epoxy/oxyalkylene-modified silicone, for example, $(CH_3)_3SiO((CH_3)_2SiO)_{3-500}((CH_3)X'SiO)_{1-5}((CH_3)Y'SiO)_{1-5}Si(CH_3)_3$, wherein X' represents a γ-glycidoxypropyl group; and Y' represents —$(CH_2)_3$—$(OCH_2CH)_{10-50}$—OH, can be used.

It may be believed that instead of using the epoxy/oxyalkylene-modified silicone oil represented by the aforementioned general formula (2), a mixture of an epoxy-modified silicone oil and an oxyalkylene-modified silicone oil might be used. However, in the case in which the non-curable coating composition of the present invention is used in a paper machine, use of an epoxy/oxyalkylene-modified silicone oil, which has affinity with respect to a wet paper provided by an oxyalkylene group together with anti-adhesive properties with respect to sticky contamination components such as pitch, and with respect to paper provided by an epoxy group, has an advantage in view of prevention of adhesion, to a press roll or the like, of the surface of a wet paper containing sticky components such as pitch immediately after producing a paper in the actual steps.

In addition, in the case of using the non-curable coating composition of the present invention in a paper machine, the oxyalkylene moiety of the epoxy/oxyalkylene-modified silicone represented by general formula (2) is preferably formed by a polyoxyethylene group, in view of non-adhesive properties to the surface of a press roll, a dryer roll, a canvas and the like of a paper machine.

The non-curable coating composition of the present invention contains the carboxy-modified silicone represented by the aforementioned general formula (1) and the epoxy/oxy-alkylene-modified silicone oil represented by the aforementioned general formula (2) in the mixing ratio represented by the weight ratio of the carboxy-modified silicone and the epoxy/oxyalkylene-modified silicone oil ranging from 1:2 to 1:30, and preferably ranging from 1:3 to 1:20.

In the non-curable coating composition of the present invention, by means of using the carboxy-modified silicone of general formula (1) together with the epoxy/oxyalkylene-modified silicone of general formula (2), releasing effects due to the ability of each component of forming a non-adhesive layer caused by adhesiveness to the surface of a substrate and the ability of each component of preventing adhesion to sticky contamination components such as pitch and the like can be exhibited.

The non-curable coating composition of the present invention further contains an oxyalkylene-modified silicone having oxyalkylene groups at the side chain, which has an HLB of 10 or more.

The aforementioned oxyalkylene-modified silicone is represented by the following general formula (3):

$$R_{3-p}Y_pSiO(R_2SiO)_a(RYSiO)_bSiY_qR_{3-q} \quad (3)$$

wherein
each R independently represents a $C_{1-6}$ alkyl group;
Y represents an oxyethylene-containing group;
p represents a number ranging from 0 to 1;
q represents a number ranging from 0 to 1;
a represents a number ranging from 0 to 100, preferably represents a number ranging from 0 to 50, and more preferably represents a number ranging from 0 to 20;
b represents a number ranging from 0 to 50, preferably represents a number ranging from 0 to 25, and more preferably represents a number ranging from 0 to 10; and
p+q+b is a number of 1 or more.

The aforementioned $C_{1-6}$ alkyl group is as described above.

The aforementioned oxyethylene-containing group is preferably represented by the formula: —$(CH_2)_r$—$(OC_2H_4)_s$—$(OC_3H_6)_t$—B wherein B represents H, OH, OR, COOH or COOR in which R is the same as defined above; r represents a number ranging from 0 to 4, and preferably represents a number ranging from 2 to 4; s represents a number ranging from 1 to 200, preferably represents a number ranging from 5 to 200, and more preferably represents a number ranging from 10 to 50; and t represents a number which is 0 or more, but less than 200, is preferably 0 or more, but less than 100, and is more preferably 0 or more, but less than 10, and 0≤t<s. As is apparent from the definition of the aforementioned formula, the oxyethylene-containing group may contain an oxypropylene group, but in the case in which an oxypropylene group is present, the ratio of an oxyethylene group/an oxypropylene group preferably exceeds 1, and it is preferable that an oxypropylene group not be present. Therefore, in the aforementioned formula, t=0 is, in particular, preferable.

As the aforementioned oxyalkylene-modified silicone, for example, $(CH_3)_2SiO((CH_3)_2SiO)_{3-50}((CH_3)Y''SiO)_{1-20}Si(CH_3)_3$, wherein Y'' represents —$(CH_2)_3$—$OCH_2CH_2)_{10-50}$—OH, can be used.

The oxyalkylene-modified silicone has an HLB preferably ranging from 10 to 18, more preferably ranging from 10.5 to 17 and furthermore preferably ranging from 11 to 16. Herein, the HLB (hydrophilic-lipophilic balance) is an HLB specified by Griffin, and is specified by the following equation:

HLB=[(Molecular weight of hydrophilic group)/(Molecular weight of the whole molecule)]×(100/5)={(Hydrophilic group weight)/((Hydrophobic group weight)+(Hydrophilic group weight))}×(100/5).

Therefore, if no hydrophilic group is present, HLB=0. Examples of hydrophilic groups may include an oxyethylene group, a hydroxyl group and the like. An oxypropylene group is regarded as a hydrophobic group.

The non-curable coating composition of the present invention can be produced by mixing the carboxy-modified silicone of general formula (1) and the epoxy/oxyalkylene-modified silicone of general formula (2) in the aforementioned mixing ratio by means of a conventional method, and further mixing the oxyalkylene-modified silicone of general formula (3) therewith by means of a conventional method. The blending amount of the oxyalkylene-modified silicone of general formula (3) is not particularly restricted. The oxyalkylene-modified silicone of general formula (3) is blended in an amount preferably ranging from 0.01 to 15 parts by weight and more preferably ranging from 0.1 to 10 parts by weight with respect to 100 parts by weight of the non-curable coating composition-excluding the aforementioned oxyalkylene-modified silicone. If the blending amount of the oxyalkylene-modified silicone of general formula (3) exceeds 15 parts by weight, a releasing property may be impaired.

The non-curable coating composition of the present invention may be used by dissolving in an organic solvent. However, in order to reduce environmental burden, an emulsion form, and in particular, a water-in-oil or oil-in-water emulsion form is preferable. In this case, water and the oxyalkylene-modified silicone of general formula (3) may be added to a mixture of the carboxy-modified silicone of general formula (1) and the epoxy/oxyalkylene-modified silicone of general formula (2) to emulsify them. Water and the oxyalkylene-modified silicone of general formula (3) may be added to each of the carboxy-modified silicone of general formula (1) and the epoxy/oxyalkylene-modified silicone of general formula (2) to form preliminary emulsions, and subsequently, they can be mixed to produce a non-curable coating composition in the form of an emulsion. The emulsification method used therein can be carried out by means of conventional means or equipment.

Another emulsifier may be used together with the oxyalkylene-modified silicone of general formula (3). For example, water and another emulsifier may be added to a mixture of the carboxy-modified silicone of general formula (1) and the epoxy/oxyalkylene-modified silicone of general formula (2) to emulsify them, and subsequently, the oxyalkylene-modified silicone of general formula (3) may be further added thereto to emulsify them. On the other hand, water and another emulsifier may be added to each of the carboxy-modified silicone of general formula (1) and the epoxy/oxyalkylene-modified silicone of general formula (2) to preliminarily form emulsions, and subsequently, the oxyalkylene-modified silicone of general formula (3) is added to one or both of the preliminary emulsions to further emulsify them, followed by mixing the emulsions, or alternatively, water and another emulsifier may be added to each of the carboxy-modified silicone of general formula (1) and the epoxy/oxyalkylene-modified silicone of general formula (2) to preliminarily form emulsions, and subsequently, both of the preliminary emulsions are mixed, followed by further adding the oxyalkylene-modified silicone of general formula (3) thereto to emulsify them. Thereby, a non-curable coating composition in the form of an emulsion can be obtained.

As an emulsifier for preparing the aforementioned emulsion, any emulsifier used in the preparation of a silicone emulsion can be used, and any emulsifier such as an anionic, cationic, amphoteric or nonionic emulsifier can be used. The emulsifier may be used alone or in combination with two or more types thereof.

As examples of anionic surfactants, mention may be made of, for example, saturated or unsaturated higher fatty acid salts such as sodium stearate and the like; long-chain-alkyl-sulfuric acid salts, alkylbenzenesulfonic acids such as dodecylbenzenesulfonic acid and the like and salts thereof; polyoxyalkylene alkyl ether sulfuric acid salts; polyoxyalkylene alkenyl ether sulfuric acid salts; polyoxyethylene alkylsulfuric acid ester salts: sulfosuccinic acid alkyl ester salts; polyoxyalkylene sulfosuccinic acid salts; long-chain-alkanesulfonic acid salts; polyoxyalkylene alkyl ether acetic acid salts; long-chain-alkyl phosphoric acid salts; polyoxyalkylene alkyl ether phosphoric acid salts; acylglutamic acid salts; alkyloyl alkyl taurine salts; N-acylamino acid salts; alkyl alkyl ether carboxylic acid salts; α-sulfofatty acid ester salts; alanine derivatives; glycine derivatives; arginine derivatives and the like. As examples of the aforementioned salts, mention may be made of alkali metal salts such as sodium salts and the like, alkanolamine salts such as triethanolamine salts and the like, and ammonium salts. Sodium salts are preferable.

As examples of cationic surfactants, mention may be made of, for example, quaternary ammonium salts such as alkyltrimethylammonium salts, dialkyldimethylammonium salts and the like.

As examples of amphoteric surfactants, mention may be made of imidazoline type, aminobetaine type, alkylbetaine type, alkylamidobetaine type, alkylsulfobetaine type, amidosulfobetaine type, hydroxysulfobetaine type, carbobetaine type, phosphobetaine type, aminocarboxylic acid type, and amidoamine acid type amphoteric surfactants.

As examples of nonionic surfactants, mention may be made of, for example, polyoxyalkylene ethers, polyoxyalkylene alkyl ethers, polyoxyalkylene fatty acid esters, polyoxyalkylene fatty acid diesters, polyoxyalkylene resin acid esters, polyoxyalkylene alkylphenols, polyoxyalkylene alkylphenyl ethers, polyoxyalkylene alkyl esters, sorbitan fatty acid esters, polyoxyalkylene sorbitan fatty acid esters, polyoxyalkylene glycerol fatty acid esters, sucrose fatty acid esters, fatty acid alkanolamides, alkylglucosides, polyoxyalkylene fatty acid bisphenyl ethers and the like.

In the non-curable coating composition of the present invention, any additives may be blended within a range which does not impair the purposes thereof. Examples of the aforementioned additives may include, for example, a viscosity modifier, a pH modifier, an antifoaming agent and the like. The types and blending amounts of the additives cart be appropriately adjusted in accordance with usages of the non-curable coating compositions of the present invention.

The non-curable coating composition of the present invention can be used as a coating agent for use in various substrates. The coating agent of the present invention is applied on the surface of a substrate, and thereby, forms a non-adhesive layer on the surface of the aforementioned substrate. Thereby, adhesion of various materials to the surface of the substrate can be prevented or reduced, and contamination of the surface of the aforementioned substrate can be prevented. The application amount of the coating agent to the surface of the substrate and the concentration of the non-curable coating composition in the coating agent can be appropriately modified in accordance with types, sizes, and the like of the substrates.

The non-curable coating composition of the present invention can be, in particular, suitably used as a contamination preventer of a paper machine.

Figure 1:
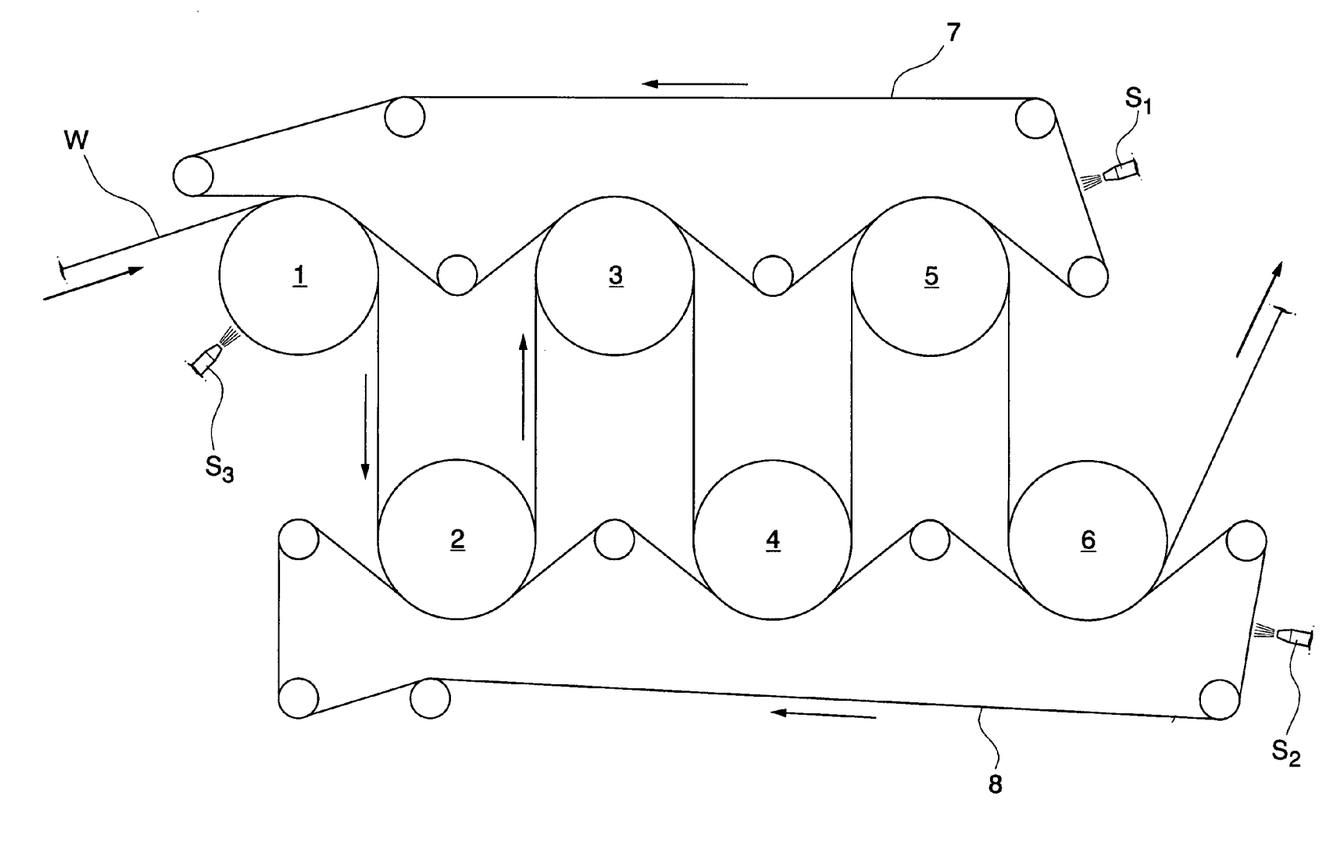
FIG. 1 is a general cross-sectional view showing one embodiment of a general drying step of a paper machine.

FIG. 1 is a general cross-sectional view showing one example of a general drying step in a paper machine. In general, in the drying step, wet paper W in the form of a web delivered from a press step not shown is provided between dryer roll 1 which is heated and top canvas 7 which is rolling. Wet paper W is pressed on the surface of dryer roll 1 by means of pressure due to top canvas 7 to absorb heat of dryer roll 1. Subsequently, wet paper W is removed from the surface of dryer roll 1 by rolling top canvas 7 and is provided between dryer roll 2 and bottom canvas 8. Here, wet paper W is pressed to the surface of dryer roll 2 by means of pressure due to bottom canvas 8 to further absorb heat of dryer roll 2. Wet paper W is removed from the surface of dryer roll 2 by rolling bottom canvas 8, and is provided between top canvas 7 and dryer roll 3. The aforementioned steps are repeated. As described above, wet paper W is successively pressed to the surface of dryer rolls 1, 2, 3, 4, 5 and 6 by rolling top canvas 7 and bottom canvas 8, and heat of each dryer roll is absorbed, and thereby, wet paper W is gradually dried.

Various components are contained in wet paper W. Such components are pitch and tar contained in raw materials of pulp themselves, ink contained in raw materials of used paper and the like. Many of the aforementioned components have sticky properties. For this reason, if paper is produced without coating dryer rolls 1, 2, 3, 4, 5, and 6, top canvas 7, and bottom canvas 8 at the time of contacting wet paper W under pressure to dryer rolls 1, 2, 3, 4, 5, and 6, top canvas 7, and bottom canvas 8, the aforementioned components adhere to the surfaces thereof. Thereby, the aforementioned surfaces are contaminated. In the contaminated dryer rolls and canvases, wet paper W adheres excessively, and baking or paper breaking occurs. For this reason, a cleaning operation must be carried out on the surface of the dryer rolls and the surface of the canvases by means of a doctor blade or the like. However, in order to carry out a cleaning operation, it is necessary to suspend the paper machine. Therefore, production efficiency of paper products is extremely reduced.

The non-curable coating composition of the present invention can be applied to the surface of a dryer roll and/or canvas, and thereby, a non-adhesive layer is formed on the aforementioned surface to effectively prevent or reduce contamination thereof. More particularly, the application amount thereof can be adjusted so that an emulsion which contains 20% of the non-curable coating composition of the present invention is formed, and it is preferably sprayed so that the amount calculated on the basis of the applied liquid ranges from 0.1 to 50 cc/min and preferably ranges from 1 to 20 cc/min.

In the embodiment shown in FIG. 1, a non-curable coating composition is applied to the surface of each of top canvas 7 and bottom canvas 8 before contacting to wet paper W by means of spray S1 and spray 32, respectively. In addition, the non-curable coating composition is also sprayed on the surface of dryer roll 1 by means of spray S3. Sprays S1, S2, and S3 may be fixing types or are movable in the width direction of the canvas and dryer roll. The non-curable coating composition is preferably also sprayed on the surface of each of dryer rolls 2, 3, 4, 5, and 6. However, if the non-curable coating composition is sprayed on the surface of dryer roll 1, a part of the non-curable coating composition transferred to wet paper W from dryer roll 1 is transferred to the surface of each of dryer rolls 2, 3, 4, 5, and 6. For this reason, the non-curable coating composition may be sprayed only on the surface of dryer roll As described above, by applying the non-curable coating composition of the present invention to the surface of a dryer roll and a canvas, adhesion of contamination substances such as pitch, tar, ink and the like to the aforementioned surface can be effectively prevented or reduced. For this reason, cleaning frequency for the aforementioned surface can be reduced, and producibility of paper products can be improved. In particular, the non-curable coating composition of the present invention is stable even under high temperature circumstances, and for this reason, the non-curable coating composition of the present invention can be used well even under high temperature circumstances such as in a paper machine of which the temperature may be 80° C. or higher.

FIG. 1 only shows the drying step of a paper machine. Even on a press step for producing wet paper in the form of a web by pressing wet paper by means of a press roller in the paper machine, a non-curable coating composition of the present invention can be used. In this case, the non-curable coating composition of the present invention is sprayed on the surface of the aforementioned press roller by means of a spray or the like, and thereby, contamination on the surface of the aforementioned press roller can be prevented. As described above, the non-curable coating composition of the present invention can be suitably used as a contamination preventer of a paper machine.

INDUSTRIAL APPLICABILITY

The non-curable coating composition of the present invention can be used in wide fields as a coating agent (such as a mold release agent) for various substrates such as molds for molding rubber or plastic products. In particular, the non-curable coating composition of the present invention can be suitably used as a contamination preventer in order to prevent or reduce adhesion of contamination substances such as pitch, tar, ink and the like to a press roll, a dryer roll, a canvas and the like used in a paper machine.

The emulsion of the present invention exhibits superior effects of preventing contamination adhesion on the surface of a dryer roll and preventing adherence of paper to the surface of a dryer roll at the steps of producing paper, as compared with a common emulsion in which a polydimethylsiloxane is based. Therefore, the emulsion of the present invention is useful as a contamination preventer of a paper machine in which adhesion of paper powder or pitch to the surface of a dryer roll at the steps of producing paper can be prevented, and paper quality and paper producibility can be improved.

EXAMPLES

Hereinafter, the present invention is described in detail with reference to the Examples and Comparative Examples. It should be understood that the present invention is not limited to these Examples. The functional silicone components used in the Examples and Comparative Examples are described below.

Example 1

One part by weight of a carboxy-modified silicone represented by the following general formula:

$(CH_3)_3SiO[(CH_3)_2SiO]_{400}[CH_3(HOOC(CH_2)_{10})SiO]_8Si(CH_3)_3$ and 7 parts by weight of an epoxy/oxyalkylene-modified silicone (hereinafter, referred to as "epoxy/polyether-modified silicone") represented by the following general formula:

$(CH_3)_3SiO((CH_3)_2SiO)_{33}((CH_3)X^1SiO)_2((CH_3)Y^1SiO)Si(CH_3)_3$ wherein $X^1$ represents a γ-glycidoxypropyl group; and $Y^1$ represents $—(CH_2)_3—(OCH_2CH_2)_{12}—OH$, were placed in a container equipped with a propeller type stirrer, and the mixture was stirred for 5 minutes at 300 rpm. In addition, 2.5 parts by weight of a 80% aqueous solution of polyoxyethylene (6 mol) isodecyl, ether was added thereto, and the mixture was stirred for 5 minutes at 150 rpm. Subsequently, 15 parts by weight of water was added thereto, and the mixture was further stirred for 60 minutes. Subsequently, while the mixture was stirred at 150 rpm, 74.47 parts by weight of water was slowly added thereto. Subsequently, 2 parts by weight of a polyoxyalkylene-modified silicone (hereinafter, referred to as "polyether-modified silicone") (HLB=16) represented by the following general formula:

$(CH_3)_3SiO[(CH_3)_2Y^2SiO]_2Si(CH_3)_3$ wherein $Y^2$ represents $—(CH_2)_3—(OC_2H_4)_{12}—OH$, was added thereto. Furthermore, 0.005 parts by weight of sodium carbonate and 0.025 parts by weight of sodium benzoate were added thereto as a pH adjustor. Thereby, a translucent milky white emulsion was obtained.

Example 2

A translucent milky white emulsion was obtained in the same manner as described in Example 1, with the exception that the polyether-modified silicone used in Example 1 was replaced with a polyether-modified silicone (HLB=13) represented by the following general formula:

$(CH_3)_3SiO((CH_3)_2SiO)_7((CH_3)Y^2SiO)_3Si(CH_3)_3$ wherein $Y^2$ represents $—(CH_2)_3—(OC_2H_4)_{12}—OH$.

Example 3

A translucent milky white emulsion was obtained in the same manner as described in Example 1, with the exception that the polyether-modified silicone used in Example 1 was replaced with a polyether-modified silicone (HLB=11) represented by the following general formula:

$(CH_3)_3SiO((CH_3)_2SiO)_9((CH_3)Y^2SiO)_2Si(CH_3)_3$ wherein $Y^2$ represents $—(CH_2)_3—(OC_2H_4)_{12}—OH$.

Example 4

A translucent milky white emulsion was obtained in the same manner as described in Example 3, with the exception that the usage amount of the polyether-modified silicone used in Example 3 was replaced with 3 parts by weight.

Example 5

A translucent milky white emulsion was obtained in the same manner as described in Example 3, with the exception that the usage amount of the polyether-modified silicone used in Example 3 was replaced with 5 parts by weight.

Example 6

A translucent milky white emulsion was obtained in the same manner as described in Example 3, with the exception that the usage amount of the polyether-modified silicone used in Example 3 was replaced with 10 parts by weight.

Example 7

A translucent milky white emulsion was obtained in the same manner as described in Example 3, with the exception that the usage amount of the polyether-modified silicone used in Example 3 was replaced with 15 parts by weight.

Example 8

A translucent milky white emulsion was obtained in the same manner as described in Example 1, with the exception that the polyether-modified silicone used in Example 1 was replaced with a polyether-modified silicone (HLB=13) represented by the following general formula:

$(CH_3)_3SiO((CH_3)_2SiO)_{15}((CH_3)Y^2SiO)_6Si(CH_3)_3$ wherein $Y^2$ represents —$(CH_2)_3$—$(OC_2H_4)_{11}$—OH.

Example 9

A translucent milky white emulsion was obtained in the same manner as described in Example 1, with the exception that the polyether-modified silicone used in Example 1 was replaced with a polyether-modified silicone (HLB=12) represented by the following general formula:

$(CH—)_3SiO((CH_3)_2SiO)_9((CH_3)Y^2SiO)_3Si(CH_3)_3$ wherein $Y^1$ represents —$(CH_2)_3$—$(OC_2H_4)_{12}$—OH.

Comparative Example 1

A translucent milky white emulsion was obtained in the same manner as described in Example 1, with the exception that no polyether-modified silicone was used.

Comparative Example 2

A translucent milky white emulsion was obtained in the same manner as described in Example 1, with the exception that the polyether-modified silicone used in Example 1 was replaced with a polyether-modified silicone (HLB=7) represented by the following general formula:

$(CH_3)_3SiO((CH_3)_2SiO)_{20}((CH_3)Y^2SiO)_3Si(CH_3)_3$ wherein represents —$(CH_2)_3$—$(OC_2H_4)_{21}$—$(OC_3H_6)_{16}$—$OC_4H_9$.

Comparative Example 3

A translucent milky white emulsion was obtained in the same manner as described in Example 1, with the exception that the polyether-modified silicone used in Example 1 was replaced with a polyether-modified silicone (HLB=4.6) represented by the following general formula:

$(CH_3)_3SiO((CH_3)_2SiO)_{70}((CH_3)Y^2SiO)_3Si(CH_3)_3$ wherein $Y^2$ represents —$(CH_2)_3$—$(OC_2H_4)_{12}$—OH.

Comparative Example 4

A translucent milky white emulsion was obtained in the same manner as described in Example 1, with the exception that the polyether-modified silicone used in Example 1 was replaced with a polyether-modified silicone (HLB=7) represented by the following general formula:

$(CH_3)_3SiO((CH_3)_2SiO)_{72}((CH_3)Y^2SiO)_5Si(CH_3)_3$ wherein $Y^2$ represents —$(CH_2)_3$—$(OC_2H_4)_{28}$—$(OC_3H_6)_{21}$—$OCOCH_3$.

Comparative Example 5

A translucent milky white emulsion was obtained in the same manner as described in Example 1, with the exception that the polyether-modified silicone used in Example 1 was replaced with a polyether-modified silicone (HLB=8) represented by the following general formula:

$(CH_3)_3SiO((CH_3)_2SiO)_{72}((CH_3)Y^2SiO)_5Si(CH_3)_3$ wherein $Y^2$ represents —$(CH_2)_3$—$(OC_2H_4)_{17}$—OCH.

[Evaluation on Releasing Property]

A stainless steel plate (150 mm×50 mm) was provided and heated to 100° C. Subsequently, to one surface of the heated stainless steel plate, about 0.06 g of each of the emulsions of Examples 1 to 9 and Comparative Examples 1 to 5 was sprayed, and uniformly applied thereto by means of Kimwipe. Immediately after the application, a commercially available adhesive fabric tape (manufactured by Teraoka Seisakusho Co., Ltd., No. 159, width=50 mm, length=100 mm) was applied to the aforementioned application surface, while the fabric tape was pressed by a palm and air was blown. In addition, after the plate with the fabric tape was allowed to stand for 25 minutes in an oven at 105° C., the fabric tape was peeled rapidly with bare hands. The degree of peeling at that time was evaluated in view of sensations in the hand on the basis of the following four standards:
1. The tape was extremely lightly peeled, and the peeled surface was also good (superior).
2. The tape was easily peeled, and the peeled surface might also be reused (good).
3. The tape was peeled, but the peeled surface might not be reused (non-usable).
4. The tape could not be peeled, or even if the tape was forced to be peeled, reuse thereof was impossible (cohesiveness).

As a control, the case in which no emulsion was applied was also evaluated. The results are shown in Tables 1 and 2.

[Evaluation on Stability at Increased Temperature]

A diluent obtained by diluting each of the emulsions of Examples 1 to 9 and Comparative Examples 1 to 5 so that a silicone content was 8%, in an amount of 100 g, was placed in a glass container with a volume of 100 cc, and the container with the emulsion was hermetically sealed. The sealed container was stored in an even at 80° C. Whether or not the emulsion was separated was visually observed, and evaluation was carried out in accordance with the evaluation criteria described below:

O: stable for 12 hours or more.

Δ: separated after 3 hours.

The results are shown in Tables 1 and 2.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Releasing property | 1 | 1 | 1 | 1 | 1 | 1 | 2 | 1 | 1 |
| Stability at increased temperature | O | O | O | O | O | O | O | O | O |

TABLE 2

| | Comp. Ex. 1 | Comp. Ex. 2 | Comp. Ex. 3 | Comp. Ex. 4 | Comp. Ex. 5 | Control |
|---|---|---|---|---|---|---|
| Releasing property | 1 | 2 | 1 | 1 | 1 | 4 |
| Stability at increased temperature | Δ | Δ | Δ | Δ | Δ | — |

From the results shown in Table 1 and Table 2, it can be seen that in the case of adding a polyether-modified silicone having an H-LB of 10 or more to a combination between a carboxy-modified silicone having carboxy groups at the side chains and an epoxy/polyether-modified silicone having epoxy groups and polyoxyethylene groups at the side chains, emulsions exhibiting superior stability at increased temperature can be provided, and the aforementioned emulsions exhibit good releasing properties, and form a non-adhesive layer exhibiting durability for practical use on a substrate. In contrast, it can be seen that in the case of using a polyether-modified silicone having an HLB of not more than 10, and in the case of using no polyether-modified silicone having an HLB of 10 or more, while a non-adhesive layer exhibiting a good releasing property can be formed, poor stability at increased temperature is exhibited.

The invention claimed is:

1. A non-curable coating composition comprising:
a carboxy-modified silicone represented by the following general formula (1):

$$R_3SiO(R_2SiO)_m(RASiO)_nSiR_3 \quad (1)$$

wherein
each R independently represents a $C_{1-6}$ alkyl group;
A represents a carboxy-containing group;
m represents a number ranging from 0 to 1,000; and
n represents a number ranging from 2 to 100,
and
an epoxy/oxyalkylene-modified silicone represented by the following general formula (2):

$$R_{3-p}X_pSiO(R_2SiO)_x(RXSiO)_y(RYSiO)_zSiX_qR_{3-q} \quad (2)$$

wherein
each R independently represents a $C_{1-6}$ alkyl group;
X represents an epoxy-containing group;
Y represents an oxyethylene-containing group;
p represents a number ranging from 0 to 1;
q represents a number ranging from 0 to 1;
x represents a number ranging from 0 to 500;
y represents a number ranging from 1 to 100; and
z represents a number ranging from 1 to 300, and
wherein said oxyethylene-containing group Y of said epoxy/oxyalkylene-modified silicone is represented by the following formula: —$(CH_2)_r$—$(OC_2H_4)_s$—$(OC_3H_6)_t$—B wherein B represents H, OH, OR, COOH or COOR wherein each R independently represents a $C_{1-6}$ alkyl group; r represents a number ranging from 0 to 4; s represents a number ranging from 1 to 200; t represents a number of 0 or more, but less than 200; and $0 \leq t < s$,
wherein the weight ratio of the carboxy-modified silicone and the epoxy/oxyalkylene-modified silicone ranges from 1:2 to 1:30,
and further comprising
an oxyalkylene-modified silicone having an HLB of 10 or more, represented by the following general formula (3):

$$R_{3-p}Y_pSiO(R_2SiO)_a(RYSiO)_bSiY_qR_{3-q} \quad (3)$$

wherein
each R independently represents a $C_{1-6}$ alkyl group;
Y represents an oxyethylene-containing group;
p represents a number ranging from 0 to 1;
q represents a number ranging from 0 to 1;
a represents a number ranging from 0 to 100;
b represents a number ranging from 0 to 50; and
p+q+b is a number of 1 or more.

2. The non-curable coating composition according to claim 1, wherein said carboxy-containing group A is represented by the following formula: —$(CH_2)_l$—COOZ wherein Z represents H, an alkali metal or ammonium; and l represents a number ranging from 0 to 12.

3. The non-curable coating composition according to claim 1, wherein said epoxy-containing group X is a glycidoxyalkyl group, an epoxycycloalkylalkyl group, or an oxyranylalkyl group.

4. The non-curable coating composition according to 1, wherein said oxyethylene-containing group Y in said oxyalkylene-modified silicone is represented by the following formula: —$(CH_2)_r$—$(OC_2H_4)_s$—$(OC_3H_6)_t$—B wherein B represents H, OH, OR, COOH or COOR in which each R independently represents a $C_{1-6}$ alkyl; r represents a number ranging from 0 to 4; s represents a number ranging from 1 to 200; t represents a number of 0 or more, but less than 200; and $0 \leq t < s$.

5. The non-curable coating composition according to 1, wherein said weight ratio ranges from 1:3 to 1:20.

6. The non-curable coating composition according to claim 1, wherein said HLB of the oxyalkylene-modified silicone ranges from 10 to 18.

7. The non-curable coating composition according to claim 1, wherein said oxyalkylene-modified silicone is blended in an amount ranging from 0.1 to 10 parts by weight with respect to 100 parts by weight of the non-curable coating composition excluding said oxyalkylene-modified silicone.

8. The non-curable coating composition according to claim 1, which is in the form of an emulsion.

9. A coating agent for forming a non-adhesive layer, comprising the non-curable coating composition according to claim 1.

10. A contamination preventer for use in a paper machine, comprising the non-curable coating composition according to claim 1.

11. The non-curable coating composition according to claim 2, wherein said epoxy-containing group X is a glycidoxyalkyl group, an epoxycycloalkylalkyl group, or an oxyranylalkyl group.

12. The non-curable coating composition according to claim 2, wherein said oxyethylene-containing group Y of said epoxy/oxyalkylene-modified silicone is represented by the following formula: —$(CH_2)_r$—$(OC_2H_4)_s$—$(OC_3H_6)_t$—B wherein B represents H, OH, OR, COOH or COOR wherein each R independently represents a $C_{1-6}$ alkyl group; r represents a number ranging from 0 to 4; s represents a number ranging from 1 to 200; t represents a number of 0 or more, but less than 200; and $0 \leq t < s$.

13. The non-curable coating composition according to claim 3, wherein said oxyethylene-containing group Y of said epoxy/oxyalkylene-modified silicone is represented by the following formula: —$(CH_2)_r$—$(OC_2H_4)_s$—$(OC_3H_6)_t$—B wherein B represents H, OH, OR, COOH or COOR wherein each R independently represents a $C_{1-6}$ alkyl group; r represents a number ranging from 0 to 4; s represents a number ranging from 1 to 200; t represents a number of 0 or more, but less than 200; and $0 \leq t < s$.

14. The non-curable coating composition according to claim 2, wherein said oxyethylene-containing group Y in said oxyalkylene-modified silicone is represented by the following formula: —$(CH_2)_r$—$(OC_2H_4)_s$—$(OC_3H_6)_t$—B wherein B represents H, OH, OR, COOH or COOR in which each R independently represents a $C_{1-6}$ alkyl group; r represents a number ranging from 0 to 4; s represents a number ranging from 1 to 200; t represents a number of 0 or more, but less than 200; and $0 \leq t < s$.

15. The non-curable coating composition according to claim 3, wherein said oxyethylene-containing group Y in said oxyalkylene-modified silicone is represented by the following formula: $-(CH_2)_r(OC_2H_4)_s-(OC_3H_6)_t-B$ wherein B represents H, OH, OR, COOH or COOR in which each R independently represents a $C_{1-6}$ alkyl group; r represents a number ranging from 0 to 4; s represents a number ranging from 1 to 200; t represents a number of 0 or more, but less than 200; and $0 \leq t < s$.

16. The non-curable coating composition according to claim 1, wherein said oxyethylene-containing group Y in said oxyalkylene-modified silicone is represented by the following formula: $-(CH2)r-(OC2H4)s-(OC3H6)t-B$ wherein B represents H, OH, OR, COOH or COOR in which each R independently represents a C1-6 alkyl group; r represents a number ranging from 0 to 4; s represents a number ranging from 1 to 200; t represents a number of 0 or more, but less than 200; and $0 \leq t < s$.

* * * * *